Sept. 4, 1923.

L. W. KENNEDY 1,466,905

NONSKID CHAIN FASTENER

Filed Oct. 14, 1922

Inventor
Lewis W. Kennedy.

By A. J. O'Brien

Attorney

Patented Sept. 4, 1923.

1,466,905

UNITED STATES PATENT OFFICE.

LEWIS W. KENNEDY, OF HOT SULPHUR SPRINGS, COLORADO.

NONSKID-CHAIN FASTENER.

Application filed October 14, 1922. Serial No. 594,572.

*To all whom it may concern:*

Be it known that I, LEWIS W. KENNEDY, a citizen of the United States, residing at Hot Sulphur Springs, in the county of Grand and State of Colorado, have invented certain new and useful Improvements in Nonskid-Chain Fasteners; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to non-skid chains and has particular reference to a fastener adapted for use in connecting the ends of the chains.

It has long been customary for automobile drivers to carry chains that may be applied to the wheels of the machine whenever the roads are wet and slippery in order to increase the traction of the wheels and to prevent skidding. Such chains are well known and form no part of my invention, and I shall therefore not describe the same further than to say that they ordinarily comprise two parallel chains joined by cross chains at spaced intervals. The ends of the parallel chains must of course be connected in order to hold the chains on the wheels, and my present invention relates to the means employed for fastening the ends together.

In order to more clearly describe my invention, I shall have reference to the accompanying drawing, in which—

Figure 1:
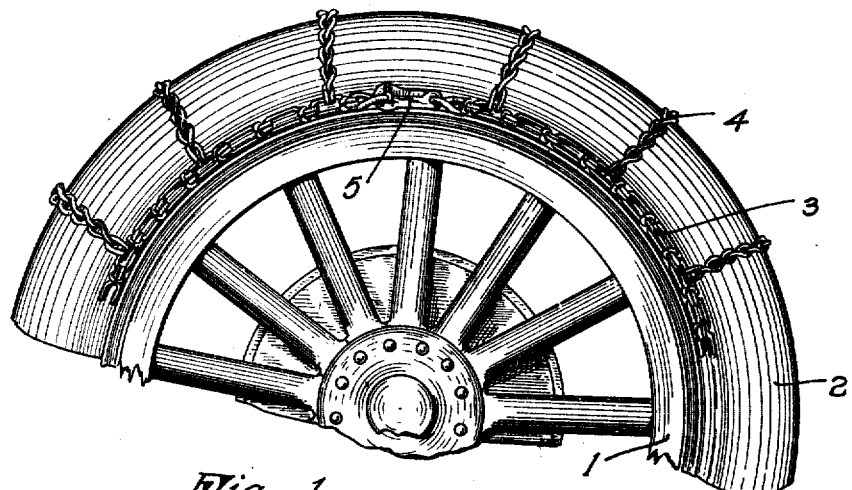
Fig. 1 shows a side elevation of a wheel with a chain in place thereon.
Figure 2:
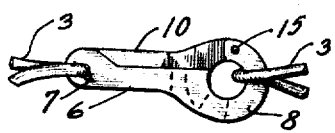
Fig. 2 is a plan view of my improved fastener in closed position.
Figure 4:
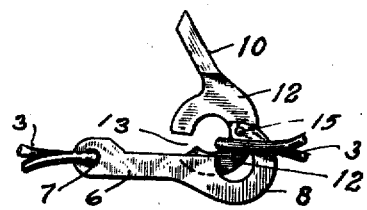
Fig. 4 is a plan view of my fastener in open position.
Figure 3:
Fig. 3 is a side elevation of the fastener shown in Fig. 2.
Figure 5:
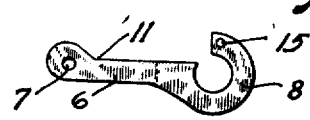
Fig. 5 is a plan view of the body portion of my fastener.
Figure 7:
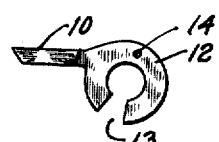
Fig. 7 is a plan view of the movable tongue or locking portion of the fastener.
Figure 8:
Fig. 8 is a side elevation of the tongue shown in Fig. 7.
Figure 6:
Fig. 6 is a side elevation of the part shown in Fig. 5.

The same reference characters will be employed to designate the same parts throughout the several views. Numeral 1 represents an ordinary automobile wheel having the usual pneumatic tire 2, and a non-skid chain applied thereto. The non-skid chain comprises a pair of parallel side chains 3, one only being shown in the drawing, and a plurality of transverse chains 4 connecting the same. The ends of chains 3 are connected by means of my improved fastener, which consists of a body portion 6 having an opening 7 in one end thereof and having the other end curved into a hook 8. The hook 8 is slotted, as indicated by numeral 9 in Fig. 6, for the reception of the tongue 10. It will be noted that the body portion 6 is cut away on one side of the center in the manner indicated by numeral 11, so as to provide a space for the reception of the tongue 10. The tongue 10 has a portion 12 that is reduced in thickness so that it will fit into the slot 9. The part 12 is made in the shape of a washer with a section cut away so as to form an opening 13 and is provided with a hole 14 that is adapted to register with the holes 15 in the hooked portion 8 which receive a pivot pin. When the tongue is in place it may be rotated from the position shown in Fig. 2 to that shown in Fig. 4. It will be apparent that when the tongue 10 is moved from the closed position (Fig. 2) to the open position (Fig. 4), that the part 12 below the pivot 15 will move towards the center of the hook, in the manner indicated in Fig. 4. As the end link of chain 3 is in place in the hook, the tension of the chain will exert a force on member 12 tending to hold the tongue in closed position, I wish to call particular attention to the construction by which the tension of the chain keeps the tongue from rotating to open position, as by this means the fastener is automatically kept closed.

Figure 9:
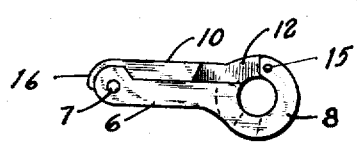
Fig. 9 is a plan view of a modified form of fastener.

In Fig. 9 I have shown a modification in which the tongue 10 is provided with an integral extension 16 that engages over the end of member 6 and acts as a catch. This construction may be preferred by some, as it keeps the fastener in closed position when the chains are not in use and thereby prevents the tongue from becoming bent.

Having now described my invention, what I claim is:

A fastener adapted to be used in securing the ends of chains, comprising a body member having one end perforated to receive a link and the other end formed into a hook, said member having a portion on one side removed, a slot in the hooked end, a tongue member having one end formed into the shape of a washer with an opening therein and the other end adapted to fit said cut away portion, and a pivot joining said members and located near the end of the first named hook, the tongue member having one end formed with an integral extension that engages over the end of the hook member and forms a catch.

In testimony whereof I affix my signature.

LEWIS W. KENNEDY.